United States Patent
Nakamura et al.

(10) Patent No.: US 9,467,402 B2
(45) Date of Patent: Oct. 11, 2016

(54) PORTABLE TERMINAL DEVICE AND SCREEN DISPLAY METHOD THEREOF

(75) Inventors: Yohei Nakamura, Kanagawa (JP); Kazunori Fukasawa, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 211 days.

(21) Appl. No.: 13/985,506

(22) PCT Filed: Nov. 30, 2011

(86) PCT No.: PCT/JP2011/006723
§ 371 (c)(1),
(2), (4) Date: Aug. 14, 2013

(87) PCT Pub. No.: WO2012/111058
PCT Pub. Date: Aug. 23, 2012

(65) Prior Publication Data
US 2013/0326367 A1 Dec. 5, 2013

(30) Foreign Application Priority Data
Feb. 15, 2011 (JP) .................................. 2011-029664

(51) Int. Cl.
H04L 12/58 (2006.01)
H04M 1/725 (2006.01)
G06F 3/0481 (2013.01)

(52) U.S. Cl.
CPC ............. *H04L 51/04* (2013.01); *G06F 3/0481* (2013.01); *H04M 1/72552* (2013.01); *H04L 51/24* (2013.01)

(58) Field of Classification Search
CPC ...................................................... H04L 51/04
See application file for complete search history.

(56) References Cited

U.S. PATENT DOCUMENTS

| 7,343,567 | B2 | 3/2008 | Mann et al. | |
|---|---|---|---|---|
| 2001/0011293 | A1 | 8/2001 | Murakami et al. | |
| 2004/0267942 | A1* | 12/2004 | Maes | 709/228 |
| 2005/0120306 | A1* | 6/2005 | Klassen et al. | 715/765 |
| 2009/0186638 | A1* | 7/2009 | Yim et al. | 455/466 |

FOREIGN PATENT DOCUMENTS

| CN | 1818843 A | 8/2006 |
|---|---|---|
| JP | 10-154117 A | 6/1998 |
| JP | 2006-351020 A | 12/2006 |
| JP | 2007-512635 A | 5/2007 |

(Continued)

OTHER PUBLICATIONS

Communication dated Nov. 20, 2014 from the European Patent Office in counterpart Application No. 11858946.4.

(Continued)

*Primary Examiner* — William Bashore
*Assistant Examiner* — Jeanette J Parker
(74) *Attorney, Agent, or Firm* — Sughrue Mion, PLLC (57) ABSTRACT

It is possible to constantly display a content of a certain IMS while securing as large a display range as possible even in the case of signing in to accounts of a plurality of IMSs, and to confirm the presence of an unread message for another IMS at the same time. A portable terminal device (100) includes multiple IMSs (1-3); a display unit (7); a display control unit (6) that displays, in a main display area (10), a content of a selected IMS and displays, in a sub display area (20), IMS icons corresponding to other non-selected IMSs; a message notification unit (4); and a messaging UI linking unit (5) that visually changes a display of the corresponding IMS icon in the sub display area (20).

6 Claims, 4 Drawing Sheets

(56) References Cited

FOREIGN PATENT DOCUMENTS

| | | |
|---|---|---|
| JP | 2010-86326 A | 4/2010 |
| WO | 03014905 A | 2/2003 |
| WO | 2005055034 A | 6/2005 |

OTHER PUBLICATIONS

Communication dated Aug. 31, 2015, issued by the State Intellectual Property Office of the P.R.C. in corresponding Chinese Application No. 201180067616.5.

* cited by examiner

PORTABLE TERMINAL DEVICE AND SCREEN DISPLAY METHOD THEREOF

CROSS REFERENCE TO RELATED APPLICATIONS

This application is a National Stage of International Application No. PCT/JP2011/006723, filed on Nov. 30, 2011, which claims priority from Japanese Patent Application No. 2011-029664, filed on Feb. 15, 2011, the contents of all of which are incorporated herein by reference in their entirety.

TECHNICAL FIELD

The present invention relates to a portable terminal device and a screen display method thereof.

BACKGROUND ART

In recent years, instant message service (IMS) has been provided to portable terminal devices such as a cellular phone unit and a PDA (Personal Digital Assistant). The use of the IMS enables real-time exchange of short messages between users connected via a network.

As related arts of the present invention, there are techniques disclosed in Patent Literatures 1 and 2, for example. Patent Literature 1 discloses a technique that enables previewing of new events on a small screen device. According to the technique, in a computing device having a plurality of applications, icons for the plurality of applications are displayed on the small screen. Further, according to the technique, the corresponding icon is visually modified upon occurrence of an event of an application, and when the visually-modified application is selected, previewing of messages for the corresponding application, for example, is displayed.

Patent Literature 2 discloses a communication system in which a server and a client terminal communicate data including an instant message, via a portable terminal. The communication system is intended to immediately notify the client terminal in operation of the transmission of data from the server to the portable terminal.

CITATION LIST

Patent Literature

[Patent Literature 1] Published Japanese Translation of PCT International Publication for Patent Application, No. 2007-512635
[Patent Literature 2] Japanese Unexamined Patent Application Publication No. 2010-086326

SUMMARY OF INVENTION

Technical Problem

Incidentally, various kinds of programs for the IMS are provided by many companies. It is extremely convenient for users of portable terminal devices to use not only a certain specific IMS but also a plurality of IMSs at the same time.

However, unlike devices including a relatively large display screen, such as a laptop computer and a desktop personal computer, display screens of portable terminal devices are small, which imposes significant limitations on the display contents and the display method thereof. Accordingly, there is a problem with how to display information about a plurality of IMSs within a limited display screen area.

When various types of IMSs are installed in a portable terminal device and a user has a plurality of accounts for signing in to these IMSs, for example, in the portable terminal device according to the related art of the present invention, the user selects one account to be signed in, and only the content to be displayed for the selected account is displayed on the display screen. Further, only the content to be displayed for the selected account is displayed as large as possible within the display screen.

The use of the above-mentioned display method of the portable terminal device according to the related art of the present invention enables constant display of the content to be displayed for a certain account, while securing as large a display range as possible. However, the display method has a problem that when there is another account to be used at the same time, the state of another account cannot be recognized.

To confirm the presence of an unread message for another account in the portable terminal device according to the related art of the present invention, for example, it is necessary to first sign in to the account and display the content related to the account, and to confirm the presence of an unread message within the display screen. In this manner, to confirm the presence of an unread message for another account, it is necessary to switch and move the display screen from a screen for the account currently displayed and browsed to a screen for the another account. It takes time and labor and is inconvenient for the user to perform such an operation.

Note that in Patent Literature 1, concerning services provided by a plurality of application, it is inconvenient to check each event of the services through activation icons for the applications. Accordingly, a plurality of icons is displayed on the screen, and the corresponding icon is visually modified upon occurrence of an event of an application, which facilitates notifying the user of a new event (paragraphs 0005 and 0008, etc.). Further, in Patent Literature 1, when the visually-modified icon is selected, a part of messages of the corresponding application, for example, is displayed as previewing (paragraph 0008, FIGS. 6 and 7, etc.).

Thus, Patent Literature 1 merely discloses the technique in which a plurality of icons is arranged and displayed within the screen and visually changed in response to event changes, and a part of messages is previewed upon selection of an icon so that the user can recognize events of a plurality of services at the same time.

Patent Literature 2 merely discloses the technique in which, concerning messages to be transmitted and received in a certain specific IMS, the transmission state and transfer state of the messages from a portable terminal to a client terminal are displayed within the screens of the portable terminal and the client terminal (FIGS. 13 and 15, etc.).

That is, in the techniques disclosed in Patent Literatures 1 and 2, it is impossible to constantly display a content of a certain account while securing as large a display range as possible even in the case of signing in to accounts of a plurality of IMSs, and to confirm the presence of an unread message for another account at the same time.

Accordingly, to solve the above-mentioned problems, it is an object of the present invention to provide, concerning a method for displaying a content of an IMS, a portable terminal device capable of constantly displaying a content of a certain IMS while securing as large a display range as possible even in the case of signing in to accounts of a plurality of IMSs, and capable of confirming the presence of an unread message for another IMS at the same time, and a screen display method thereof.

Solution to Problem

A portable terminal device according to a first exemplary aspect of the present invention includes a plurality of instant message services which are application programs that provide a user with an instant message service, each of the instant message services being signed in to an account; a display unit that displays a display screen including a main display area and a sub display area provided separately from the main display area; a display control unit that controls a display of the display unit to display, in the main display area, a content of a service provided by an instant message service selected from among the plurality of instant message services, and to display, in the sub display area, instant message service icons corresponding to other non-selected instant message services; a message notification unit that detects that the terminal device has received an instant message, and notifies an occurrence of an incoming instant message; and a messaging user interface linking unit that judges which one of the plurality of instant message services the instant message received by the terminal device corresponds to, in response to the notification from the message notification unit, and outputs a display screen update instruction to the display control unit to visually change a display of the corresponding instant message service icon in the sub display area so as to display presence of an unread message for the corresponding instant message service, when the instant message is not a message for the instant message service currently displayed and browsed in the main display area.

A screen display method of a portable terminal device according to a second exemplary aspect of the present invention includes a display control step of controlling a display of a display screen including a main display area and a sub display area provided separately from the main display area, to display, in the main display area, a content of a service provided by an instant message service selected from among a plurality of instant message services, and to display, in the sub display area, instant message service icons corresponding to other non-selected instant message services; a message notification step of detecting that a terminal device has received an instant message and notifying an occurrence of an incoming instant message; and a messaging user interface linking step of judging which one of the plurality of instant message services the instant message received by the terminal device corresponds to, in response to the notification, and outputting a display screen update instruction to visually change a display of the corresponding instant message service icon in the sub display area so as to display presence of an unread message for the corresponding instant message service, when the instant message is not a message for the instant message service currently displayed and browsed in the main display area.

Advantageous Effects of Invention

According to the present invention, concerning a method for displaying an IMS, it is possible to provide a portable terminal device capable of constantly displaying a content of a certain IMS while securing as large a display range as possible even in the case of signing in to accounts of a plurality of IMSs, and capable of confirming the presence of an unread message for another IMS at the same time, and a screen display method thereof.

DESCRIPTION OF EMBODIMENTS

First Exemplary Embodiment

An exemplary embodiment of the present invention will be described below with reference to the drawings.

Figure 1:
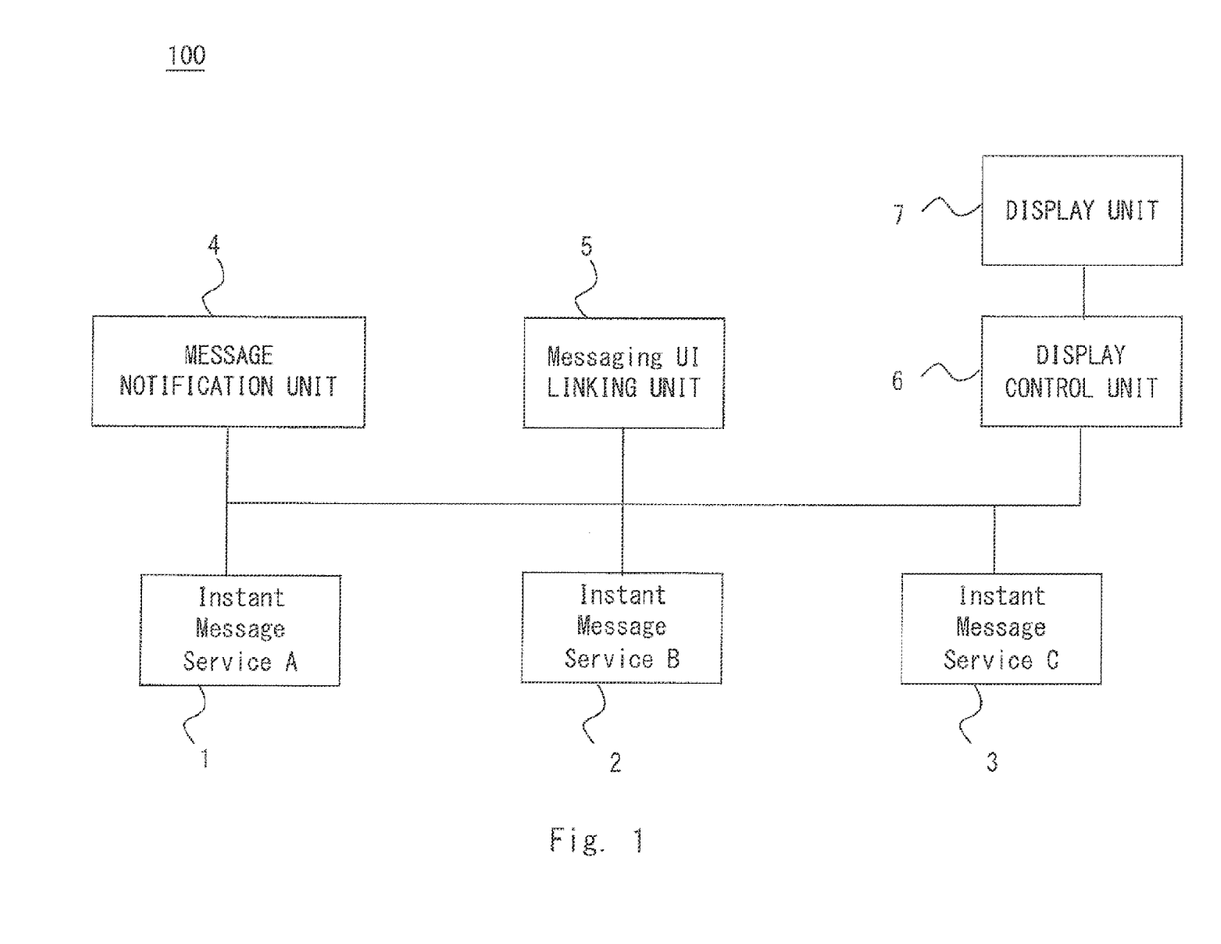
FIG. 1 is a functional block diagram of a portable terminal device according to a first exemplary embodiment.

FIG. 1 is a functional block diagram of a portable terminal device according to this exemplary embodiment. A portable terminal device 100 includes a plurality of signed-in IMSs 1 to 3 (Instant Message Service A, Instant Message Service B, and Instant Message Service C), a message notification unit 4, a Messaging UI linking unit 5, a display control unit 6, and a display unit 7.

Although not shown, the portable terminal device 100 includes: a control unit (CPU: Central Processing Unit) that controls each unit of the portable terminal device 100 according to a program; a ROM (Read Only Memory) that stores the program; a RAM (Random Access Memory) for use in executing the program; an input operation unit with which a user performs an input operation; an input control unit that is connected to the input operation unit and detects an input; a radio communication unit that transmits and receives data to and from an external device via a base station or the like; and a radio communication control unit that controls the radio communication unit.

The input operation unit is a user interface included in the portable terminal device 100, and is implemented using a known input device, such as a keyboard or a touch panel, which is included in the portable terminal device 100. The user operates the keys of the keyboard, or operates the touch panel by touching, thereby enabling operation of the portable terminal device 100.

In the example shown in FIG. 1, the IMSs, which are already signed in to the account, among the IMSs installed in the portable terminal device 100 are displayed. Further, the display unit 6 may be configured as hardware (circuit) or software having a similar function, or may be installed in the portable terminal device 100.

The IMSs 1 to 3 (Instant Message Service A, Instant Message Service B, and Instant Message Service C) are application programs that provide instant message services. Each of the IMSs 1 to 3 runs on the portable terminal device 100, and has functions of receiving an instant message (hereinafter, referred to simply as "message") from an external device and generating message display data, for example. Each of the IMSs 1 to 3 also has functions of inputting a message and generating an outbound message, for example.

The user authenticates a user ID and a password, for example, thereby enabling signing-in to the account of the IMS. This allows the user to use the instant message service by using the portable terminal device 100.

The message notification unit 4 detects that the portable terminal device 100 has received a message, and notifies the Messaging UI linking unit 5 of the occurrence of the incoming message.

The Messaging UI (messaging user interface) linking unit 5 judges which one of the IMSs the message received by the portable terminal device 100 corresponds to, in response to the notification from the message notification unit 4. Specifically, the Messaging UI linking unit 5 judges which one of the IMSs the message corresponds to, based on the user ID included in the received message. The Messaging UI linking unit 5 notifies the corresponding IMS of the arrival of a new message.

As a result of the above-mentioned judgment, when the message is not a message corresponding to the IMS currently displayed and browsed, the Messaging UI linking unit 5 outputs a display screen update instruction to the display control unit 6 so as to display, on a display screen, the presence of an unread message for the IMS. Further, the Messaging UI linking unit 5 is capable of not only displaying the presence of an unread message for the IMS, but also displaying the number of unread messages on the display screen. For example, the Messaging UI linking unit 5 counts the number of unread messages for the IMSs other than the IMS currently displayed and browsed, and records a count value in the RAM or the like, thereby making it possible to recognize the number of unread messages.

Furthermore, the Messaging UI linking unit 5 notifies the IMS, which is the reception destination of the message, of the arrival of the message. The IMS having received the notification from the Messaging UI linking unit 5 receives the message.

The display control unit 6 is connected to the display unit 7 and controls the display of the display unit 7. The display unit 7 is implemented using a display device (not shown) which is disposed on the front surface of the main body of the portable terminal device 100. For example, a monochrome or color liquid crystal panel or an organic EL (electronic fluorescent) is used. As described in detail later, the display screen of the display unit 7 includes a main display area 10 and a sub display area 20 which is provided separately from the main display area 10. The display control unit 6 displays, in the main display area 10, a content of a service provided by an IMS selected by the user from among a plurality of IMSs, and displays, in the sub display area 20, IMS icons respectively corresponding to the other non-selected IMSs.

Figure 2:
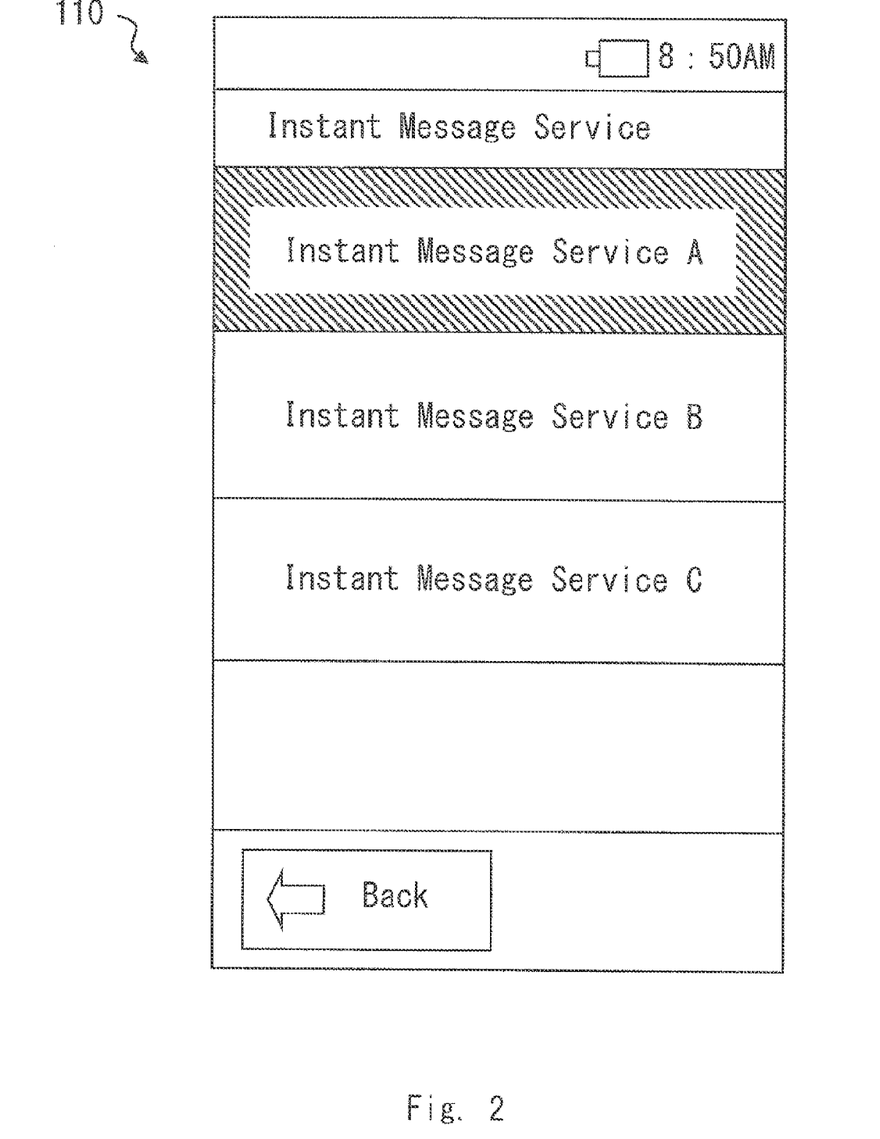
FIG. 2 is a screen display of the portable terminal device according to the first exemplary embodiment.
Figure 3:
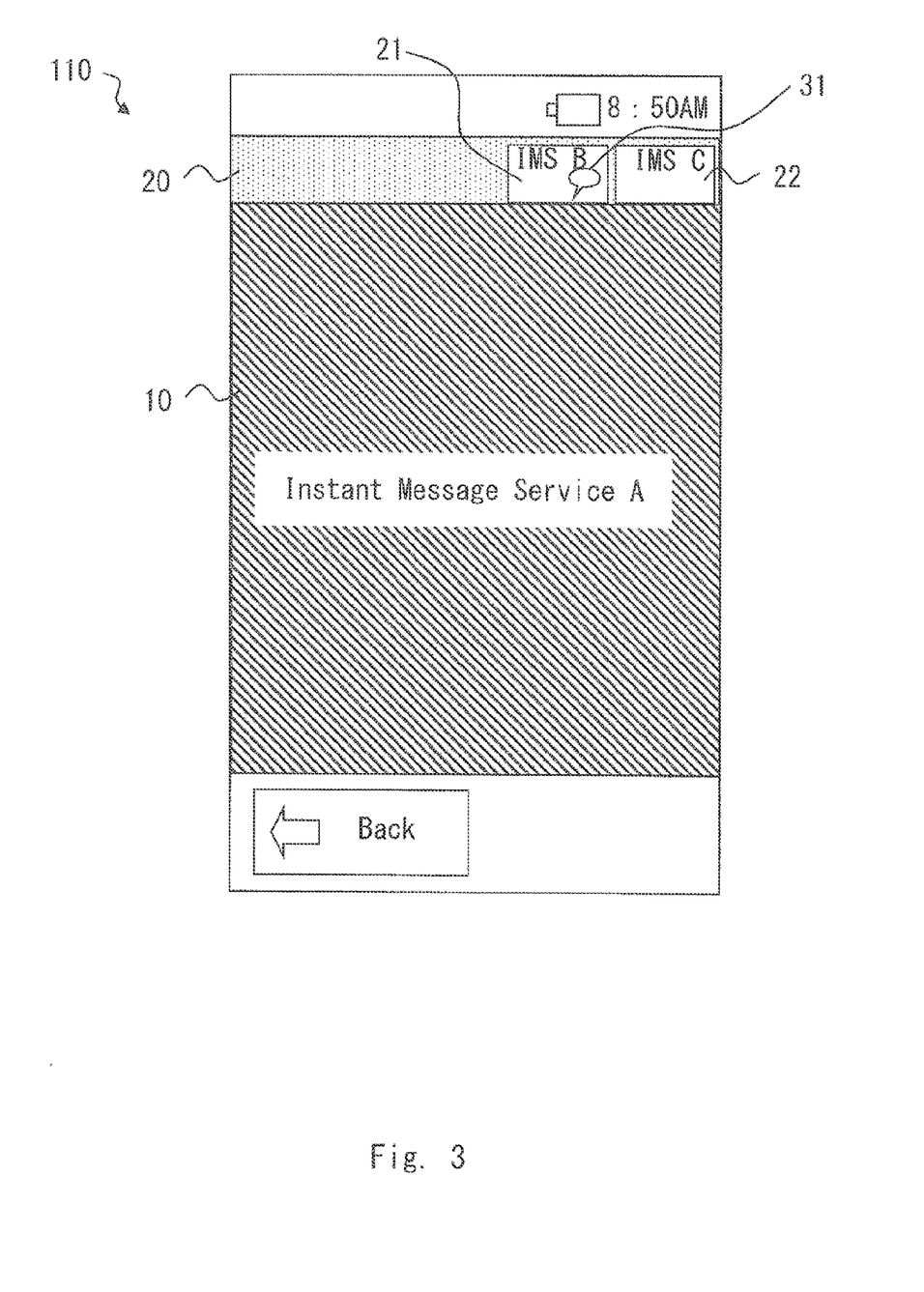
FIG. 3 is a screen display of the portable terminal device according to the first exemplary embodiment.

FIGS. 2 and 3 show display examples of the screen according to this exemplary embodiment.

Referring to FIG. 2, the plurality of IMSs 1 to 3 (Instant Message Service A, Instant Message Service B, and Instant Message Service C) which are installed in the portable terminal device 100 is displayed on a display screen 110. In other words, referring to FIG. 2, a list of the IMSs installed in the portable terminal device 100 is displayed. Though a list of the three IMSs 1 to 3 is displayed in the example shown in FIG. 2, four or more IMSs may be installed and displayed, or one or two IMSs may be installed and displayed.

In the state shown in FIG. 2, when the user selects the IMS to be signed in from the list of the installed IMSs, the display screen is switched to a user information input screen for the IMS. The user inputs the user ID and the password on the user information input screen, thereby enabling signing-in to the account of the IMS. Upon completion of the signing-in on the user information input screen, the display screen returns to the display screen shown in FIG. 2 again. After the display screen returns to the display screen shown in FIG. 2, when the user selects the signed-in IMS, the screen display is switched to that shown in FIG. 3, and the content of the message for the IMS selected by the user is displayed in the main display area 10. For example, when all the installed IMSs 1 to 3 shown in FIG. 2 are signed in on a user input screen (that is, when all the IMSs 1 to 3 are signed in), the user selects the Instant Message Service A (IMS1) on the display screen shown in FIG. 2, thereby making it possible to switch the screen display to the screen illustrated in FIG. 3.

As illustrated in FIG. 3, the display screen 110 includes the main display area 10 and the sub display area 20. Referring to FIG. 3, the sub display area 20 is provided adjacent to an upper portion of the main display area 10. The main display area 10 is used to display the message for the IMS selected by the user. The sub display area 20 is provided separately from the main display area 10, and is used to display the unread state of messages for the IMSs which are not selected by the user. That is, the content of the message for the IMS selected by the user is displayed in the main display area 10, and the unread state of messages for the non-selected IMSs is displayed in the sub display area 20. To constantly display the content of the message for the IMS selected by the user, the main display area 10 of the display screen 110 occupies a relatively large range, as compared with the range occupied by the sub display area 20.

Referring to FIG. 3, IMS icons 21 and 22 respectively representing the IMSs, which are not selected by the user, are displayed in the sub display area 20. Further, an unread message presence icon 31 which indicates the presence of an unread message is displayed on the IMS icon 21. That is, as for the IMSs which are not selected by the user, only the presence of the IMSs and the presence of an unread message are displayed in the sub display area 20.

Note that as for the unread message presence icon 31, the unread message presence icon 31 may be displayed, in addition to the IMS icon 21, only when there is an unread message. Further, the number of unread messages may be displayed on the unread message presence icon 31. The layout and design of the IMS icons 21 and 22 and the unread message presence icon 31 are not particularly limited, and other layouts and designs may be adopted.

In the example shown in FIG. 3, the content of the IMS1 (Instant Message Service A) selected by the user is displayed in the main display area 10. The content of each message to be exchanged with another user is displayed, for example. The IMS icon 21 representing IMS2 (Instant Message Service B), which is not selected by the user, and the IMS icon 22 representing IMS3 (Instant Message Service C), which is not selected by the user, are displayed in the sub display area 20. Further, because an unread message for the IMS2 (Instant Message Service B) is present, the unread message presence icon 31 is displayed on the IMS icon 21 in the sub display area 20.

Figure 4:
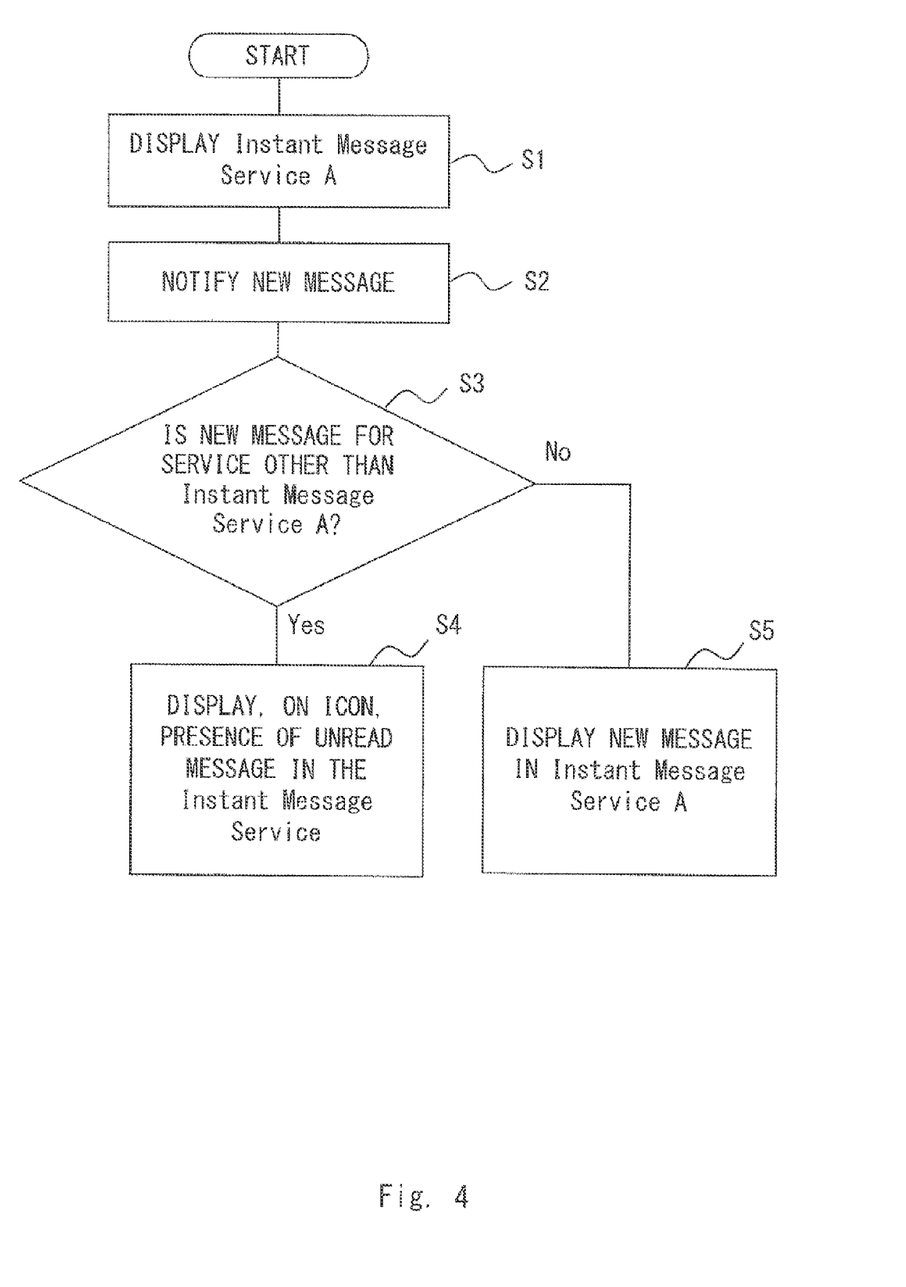
FIG. 4 is a flowchart showing a screen display procedure according to the first exemplary embodiment.

FIG. 4 is a flowchart showing a screen display procedure according to this exemplary embodiment. Referring to FIG. 4, a description is made of an example in which the content of the IMS1 (Instant Message Service A) selected by the user is displayed in the main display area 10 (that is, the user is displaying and browsing the content of the IMS1).

First, when a new message arrives at the portable terminal device 100 in the state where the content of the IMS1 (Instant Message Service A) is displayed in the main display area 10 (S1), the message notification unit 4 notifies the Messaging UI linking unit 5 of the arrival of the new message (S2).

The Messaging UI linking unit 5 having received the notification judges whether the new message is a message for the account of the IMS1 currently displayed and browsed (S3). As a result of the judgment, when the new message is not a message for the IMS1, the Messaging UI linking unit 5 outputs the display screen update instruction to the display control unit 6 (S4) so as to visually change the display of the corresponding IMS icon in the sub display area 20. More specifically, the Messaging UI linking unit 5 updates the unread message presence icon on the IMS icon for the corresponding IMS in the sub display area 20. As a result, the presence of an unread message for the IMSs other than the IMS currently displayed and browsed is displayed in the sub display area 20.

As a result of the judgment, when the new message is a message for the IMS1, the Messaging UI linking unit 5 notifies the IMS1 of the arrival of the message. The IMS1 having received the notification generates the message display data from the received message, for example, outputs the display screen update instruction to the display control unit 6, and displays the new message in the main display area 10 (S5). Thus, the content of the new message for the IMS currently displayed and browsed is displayed in the main display area 10.

To switch the IMS to be displayed in the main display area 10, the user may operate the IMS icons 21 and 22 in the sub display area 20 by touching, for example. When the IMS icon 21 in the sub display area 20 is operated by touching, for example, the IMS2 displays the message in the main display area 10, and the Messaging UI linking unit 5 displays the IMS icon for the IMS1 in the sub display area 20.

According to the procedure described above, as illustrated in FIG. 3, when a new message for the signed-in IMS2 (Instant Message Service B) has arrived during the display of the IMS1 (Instant Message Service A) in the main display area 10, the Messaging UI linking unit 5 having received the notification from the message notification unit 4 judges that not a message for the IMS1 currently displayed and browsed, but a message for the IMS2 has arrived, and outputs the display screen update instruction to the display control unit 6 so as to display the unread message presence icon 31 on the IMS icon 21 for the IMS2. The display control unit 6 having received the display instruction from the Messaging UI linking unit 5 outputs the display screen update instruction to the display unit 7. Further, the unread message presence icon 31 is displayed on the IMS icon 21 in the sub display area 20.

Accordingly, the user can confirm the presence of unread messages for other IMSs (IMS2 and IMS3) at the same time, while allowing the content of the IMS1 to be constantly displayed in the main display area 10 in the state of being signed in to the accounts of the plurality of IMSs 1 to 3. Further, the user can recognize the arrival of new messages for other IMSs (IMS2 and IMS3) and the presence of unread messages, without switching the screen.

Note that the present invention is not limited to the above-described exemplary embodiments, but can be modified as appropriate without departing from the gist of the present invention.

Though the present invention has been described above with reference to exemplary embodiments, the present invention is not limited to the above-described exemplary embodiments. The configuration and details of the present invention can be modified in various manners which can be understood by those skilled in the art within the scope of the invention.

This application is based upon and claims the benefit of priority from Japanese patent application No. 2011-029664, filed on Feb. 15, 2011, the disclosure of which is incorporated herein in its entirety by reference.

REFERENCE SIGNS LIST

100 PORTABLE TERMINAL DEVICE
1-3 IMS
4 MESSAGE NOTIFICATION UNIT
5 MESSAGING UI LINKING UNIT
6 DISPLAY CONTROL UNIT
7 DISPLAY UNIT
110 DISPLAY SCREEN
10 MAIN DISPLAY AREA
20 SUB DISPLAY AREA
21, 22 IMS ICON
31 UNREAD MESSAGE PRESENCE ICON

The invention claimed is:

1. A portable terminal device comprising:
    a plurality of instant message services, each of which are application programs that
        provide a user with a corresponding instant message service,
        each of the instant message services being signed in to an account;
    display unit displaying a display screen including
        a main display area and
        a persistent sub display area provided separately from the main display area and not overlapping the main area;
    display control unit controlling a display of the display unit and displaying,
        in the main display area, a content of a service provided by an instant message service selected from among the plurality of instant message services, and displaying,
        in the sub display area, instant message service icons, each of the icons corresponding to other non-selected instant message services;
    message notification unit detecting that the terminal device has
        received an instant message, and
        notifying an occurrence of an incoming instant message; and
    messaging user interface linking unit
        determining which one of the plurality of instant message services the instant message received by the terminal device corresponds to, in response to the notification from the message notification unit, and
        outputting a display screen update instruction to the display control unit and displaying, in the sub display area, an unread message presence icon which indicates presence of an unread message for the determined instant message service currently displayed in the sub display area,
        wherein the received instant message is not a message for the instant message service currently displayed and browsed in the main display area.

2. The portable terminal device according to claim 1, wherein the messaging user interface linking unit determines which one of the plurality of instant message services the message corresponds to, based on a user ID included in the instant message received by the terminal device.

3. The portable terminal device according to claim 1,
wherein when the instant message received by the terminal device is not a message for the instant message service currently displayed and browsed in the main display area,
the messaging user interface linking unit counts the number of unread messages, stores the number of unread messages into a memory, and
causes the corresponding instant message service icon and the number of unread messages stored in the memory to be displayed in the sub display area.

4. A screen display method of a portable terminal device, comprising:
a display control controlling a display of a display screen including
a main display area and
a persistent sub display area provided separately from the main display area and not overlapping the main area,
displaying, in the main display area,
a content of a service provided by an instant message service selected from among a plurality of instant message services, and
displaying, in the sub display area,
instant message service icons, each of the icons corresponding to other respective non-selected instant message services;
a message notification unit
detecting that a terminal device has received an instant message and notifying an occurrence of an incoming instant message; and
a messaging user interface linking unit
determining which one of the plurality of instant message services the instant message received by the terminal device corresponds to, in response to the notification, and
outputting a display screen update instruction and displaying, in the sub display area, an unread message presence icon which indicates presence of an unread message for the determined instant message service currently displayed in the sub display area, wherein the received instant message is not a message for the instant message service currently displayed and browsed in the main display area.

5. The screen display method of a portable terminal device according to claim 4, wherein the messaging user interface linking includes determining which one of the plurality of instant message services the message corresponds to, based on a user ID included in the instant message received by the terminal device.

6. The screen display method of a portable terminal device according to claim 4, wherein the messaging user interface linking includes counting the number of unread messages, storing the number of unread messages into a memory, and causing the corresponding instant message service icon and the number of unread messages stored in the memory to be displayed in the sub display area, when the instant message received by the terminal device is not a message for the instant message service currently displayed and browsed in the main display area.

* * * * *